US005496112A

United States Patent [19]
Browne

[11] Patent Number: 5,496,112
[45] Date of Patent: Mar. 5, 1996

[54] MINIATURE PAN EVAPORIMETER FOR GAUGING THE DIFFERENCE BETWEEN EVAPOTRANSPIRATION AND EFFECTIVE RAINFALL

[75] Inventor: Christopher L. Browne, Corvallis, Oreg.

[73] Assignee: Moisture Dynamics, Inc., Corvallis, Oreg.

[21] Appl. No.: 172,139

[22] Filed: Dec. 21, 1993

[51] Int. Cl.$^6$ .............................. G01N 25/56; G01W 1/00
[52] U.S. Cl. ............................ 374/54; 73/170.21; 159/32
[58] Field of Search .................... 374/45, 54; 73/170.16, 73/170.17, 170.18, 170.21, 170.22, 170.23; 159/21, 22, 30, 31, 32; 116/309, 319, 320; 248/146, 156, 180, 182

[56] References Cited

U.S. PATENT DOCUMENTS

| | | |
|---|---|---|
| 1,625,420 | 4/1927 | Patterson . |
| 2,509,522 | 5/1950 | Phillips ................................. 73/170.17 |
| 2,520,557 | 8/1950 | Moore .................................. 73/170.17 |
| 2,821,852 | 2/1958 | Hastings ............................... 73/170.17 |
| 2,907,206 | 10/1959 | O'Neil ................................. 73/170.17 |
| 3,122,257 | 2/1964 | Soehrman .............................. 248/182 |
| 3,360,985 | 1/1968 | Christian . |
| 3,443,420 | 5/1969 | McMahan ................................. 73/73 |
| 3,535,925 | 10/1970 | Woofter ............................... 73/170.17 |
| 3,818,858 | 6/1974 | Kramer et al. ......................... 116/309 |
| 4,233,841 | 11/1980 | Abele .................................. 73/170.17 |
| 4,324,132 | 4/1982 | Williams . |
| 4,412,447 | 11/1983 | McMahon ............................. 116/227 |
| 4,418,576 | 12/1983 | White . |
| 5,038,606 | 8/1991 | Geschwender et al. ............. 73/170.17 |
| 5,044,200 | 9/1991 | Dailey et al. . |

OTHER PUBLICATIONS

Williams, et al., "A Portable Evaporimeter for Rapid Measurement of the Evaporation Rate of Water", *Agricultural Water Management*, pp. 218–224 (1984).

Norum, "Gauging Crop Water Needs", *Irrigation Journal*, vol. 43, pp. 8, 12–17 (Jul./Aug. 1993).

Cuenca, *Irrigation System Design*, Dept. of Agricultural Engineering, Oregon State University, Chapter 5, pp. 132–135.

Bloemen, "A High–Accuracy Recording Pan–Evaporimeter and Some of its Possibilities", *Journal of Hydrology*, vol. 39, pp. 159–173 (1978).

Reddy, et al., "A Preliminary Study on Scheduling Irrigation with Can Evaporimeter", *Agricultural Water Management*, vol. 6, pp. 403–407 (1983).

Doorenbos, et al., *Guidelines for Predicting Crop Water Requirements*, Food and Agriculture Organization of the United Nations, pp. 30–34 (1977).

Thom, et al., "On the Proper Employment of Evaporation Pans and Atmometers in Estimating Potential Transpiration", *Quart. J. R. Met. Soc.*, vol. 107, pp. 711–736 (1981).

*Primary Examiner*—William A. Cuchlinski, Jr.
*Assistant Examiner*—Andrew Hirshfeld
*Attorney, Agent, or Firm*—Klarquist Sparkman Campbell Leigh & Whinston

[57] ABSTRACT

An evaporimeter has first and second stacked containers for holding water and a scale for measuring the amount of water in the containers. The containers are covered by a screen and are balanced on and supported by a ground spike. An outlet is located at the same elevation as a zero level on the scale so that water can be quickly drained to that level. Readings taken from the scale can be used to regulate irrigation of the surrounding plants.

20 Claims, 8 Drawing Sheets

MINIATURE PAN EVAPORIMETER FOR GAUGING THE DIFFERENCE BETWEEN EVAPOTRANSPIRATION AND EFFECTIVE RAINFALL

BACKGROUND OF THE INVENTION

This invention relates to instruments that measure evaporation of water from an open container, and that are used to determine the timeliness and appropriate amount of irrigation for plants and lawns. Such devices are commonly called pan evaporimeters.

Efficient irrigation starts with knowledge of the amount of water that has evaporated from an irrigated area since the previous irrigation. This amount is called evapotranspiration, or simply ET, and is measured in units of water height (inches or millimeters).

The rate of evapotranspiration from healthy, well-watered grass (inches/day or inches/week) is called "reference evapotranspiration." This rate is affected by solar radiation, humidity, temperature, and wind. As such, reference evapotranspiration provides an effective and quantitative measure of the weather for irrigation purposes.

Agriculturalists have long used reference evapotranspiration, combined with rainfall measurement, as the basis for scheduling the irrigation of pastures and crops (Cuenca, R. H., *Irrigation System Design: An Engineering Approach*, Prentice-Hall, Inc., Englewood Cliffs, N.J.; pp. 115–188 (1989)). However, with the increasing and widespread need to conserve water, ET information is now commonly used to schedule the irrigation of golf courses, parks, and city landscapes.

In some regions, homeowners are being advised of current daily or weekly ET rates through local newspapers and radio. The objective is to help people determine how long to run their lawn and garden sprinklers by knowing current evaporative conditions for their area.

Historically, the U.S. Weather Bureau Class "A" pan evaporimeter has been the most widely-used device to provide regional measurements of evapotranspiration throughout the world. These large devices are 48 inches in diameter, and are replenished daily to maintain a precise water depth of 8 inches. They are typically located at agricultural research facilities.

A predictable relationship between evaporation from U.S. Class "A" pans and evapotranspiration from well-watered grass has been established (Doorenbos, J. and Pruitt, W. O., "Crop Water Requirements," *Food and Agriculture Organization of the United Nations, Irrigation and Drainage Paper No.* 24, Rome, Italy (1977)). Such relationships exist because evaporation of water from pans, like that from plants, is responsive to radiation, wind, temperature, and humidity. Pans with a large water capacity, such as the Class "A" pan, however, exhibit heat storage that causes the evaporation rate to lag significantly behind radiation input. This can cause substantial evaporation at night when plants are not transpiring. Readings from large pans, therefore, are not particularly meaningful on a daily basis, but become more useful when averaged over a period of 7 to 10 days. Such intervals are appropriate for many agricultural applications, but not so for situations that require frequent water applications, such as the maintenance of high quality turfgrass.

Another disadvantage of large unscreened pans is that an open water surface absorbs more solar radiation than a grass surface (Thom et al., "On the Proper Employment of Evaporation Pans and Atometers in Estimating Potential Transpiration," *Quarterly Journal of the Royal Meteorological Society*, 107:711–736 (1981)). This contributes to the 25% to 33% greater evaporation from Class "A" pans surrounded by well-watered grass, than from the grass itself. Hence the need for pan coefficients of the order 0.75 to 0.85 (see Equation (1)). If a pan is not surrounded by green grass, and is subject to hot, drying winds, the pan coefficient can be as low as 0.35 (Doorenbos and Pruitt).

More recently, there has been a trend toward the use of automated meteorological stations to provide estimates of current ET. In California, USA, for example, more than ninety automated meteorological stations have been installed throughout the state to provide such information. These provide hourly measurements of solar radiation, wind speed, temperature, humidity, and rainfall for estimating daily evapotranspiration and effectiveness of rainfall. The devices are highly technical, expensive, and rely upon computers.

The above approaches, however, are not particularly practical for providing homeowners with information on current watering requirements. Furthermore, they do not adequately account for the effect of localized micro-climates and rainfall upon watering needs. Thus it can be appreciated there exists a need for a simple and inexpensive evaporimeter-type device that provides homeowners with a measure of the current irrigation requirement for their own particular location.

Ideally, the device would visually and readily indicate the net amount of water required to replace that which had evaporated since previous irrigation. That is, the difference between accumulative evapotranspiration loss and effective rainfall received, or "net evapotranspiration." To provide accurate daily readings, the device would preferably contain only a small volume of water so as to respond rapidly to radiation and temperature changes, be suited to placement close to a vegetative surface such as grass, and be of such design that the relationship between the evaporation rate of its water content and that from well-watered grass is known. That is, the device would be designed to have a known pan coefficient ($K_{pan}$, Equation (1)). Furthermore, it would be an advantage if the device could be used to determine the application rate of sprinklers, and therefore the duration of watering required to replace net evapotranspiration losses.

A miniature and novel pan evaporimeter that achieves these and other objectives is the subject of this disclosure.

SUMMARY OF THE INVENTION

The irrigation requirement of healthy, nonstressed turfgrass was compared with evaporation from U.S. Class "A" pan evaporimeters at a number of geographical locations in western United States and Canada.

In each case, the turfgrass was irrigated by an automatic sprinkler system regulated by a moisture sensor, of the type described in U.S. Pat. No. 4,922,945, that responds to change in soil water flux. The sensor at each site was placed at a uniform depth of 4", and the amount of water used by the turfgrass was determined from automatically recorded data.

Reference evapotranspiration was calculated using daily U.S. Class "A" pan evaporation records obtained from agricultural research facilities located near each site, the appropriate equation to convert pan evaporation to reference evapotranspiration being (Doorenbos and Pruitt):

$$ET = K_{pan} \times E_{pan}$$

where

ET=reference evapotranspiration for grass (inches of water)

$K_{pan}$=the pan coefficient corrected for pan type, humidity, wind speed, and pan location $E_{pan}$=pan evaporation (inches of water)

It was found that the net irrigation requirement of healthy, nonstressed turf grass, or "net evapotranspiration," was directly related to U.S. Class "A" pan evaporation measurements and rainfall by the following relationship:

$$ET_{net} = K_{pan} \times (E_{pan} - R) \qquad (2)$$

or $$ET_{net} = (K_{pan} \cdot E_{pan}) - (K_{pan} \cdot R) \qquad (3)$$

where $ET_{net}$=evapotranspiration from healthy, nonstressed grass net of effective rainfall (inches of water)

$K_{pan}$=the pan coefficient $E_{pan}$=U.S. Class "A" pan evaporation (inches of water)

R=rainfall received (inches of water) $K_{pan} \cdot E_{pan}$=reference evapotranspiration for grass (inches of water, see Equation (1))

$K_{pan} \cdot R$=a measure of the effectiveness of rainfall in satisfying evapotranspiration from healthy, nonstressed grass (in inches of water)

Consider now that pan evaporation is measured by adding water to a pan and determining the height of water required to replenish that removed by evaporation. If rainfall occurs, the amount of rainfall is independently measured and added to the evaporation measurement to determine total pan evaporation. If rainfall occurs in excess of evaporation, then the excess is measured, removed from the pan, and discarded. The appropriate equation for calculating pan evaporation is thus:

$$E_{pan} = WA + R - RR \qquad (4)$$

where $E_{pan}$=accumulative pan evaporation over a given period of time (inches of water)

WA=water added to the pan during the same period (inches)

R=rainfall received during the same period (inches)

RR=excess rainfall removed from the pan during the same period (inches)

Substitution of Equation (4) for $E_{pan}$ in Equation (2) leads to Equation (5), and eliminates the measured rainfall component:

$$ET_{net} = K_{pan} \times (WA - RR) \qquad (5)$$

In other words, as defined by Equation (5), net evapotranspiration from healthy, nonstressed grass ($ET_{net}$) can be gauged by a pan evaporimeter if the amount of water added to the pan to make a measurement (WA) is reduced by an amount equal to the excess rainfall removed (RR), and if the pan coefficient ($K_{pan}$) is known. Means for reducing temporal variations in the pan coefficient include installation of the device in close proximity to and above a healthy, well-watered vegetative surface.

A device that gauges net evapotranspiration from well-watered grass by solving the elements of this new Equation (5) is the subject of this invention. Beside eliminating the need to independently measure rainfall, (as required for applications of Equation (1)), the device has also other novel, useful, and practical features. These include use of the device to gauge the amount of water to apply ($ET_{applied}$) to plants other than well-watered grass by incorporation of a plant factor ($K_c$), as set forth in Equation (6). A value for $K_c$ of 0.7 is often adequate for many situations.

$$ET_{applied} = K_c \times K_{pan} \times (WA - RR) \qquad (6)$$

A pan evaporimeter according to the present invention comprises a first container for holding water in close proximity to a vegetative surface, the container being supported in a level condition by, for example, a ground spike. Typically, the water-filled device is placed upon a lawn, or within a garden bed, and visually provides a measure of the extent to which accumulative evapotranspiration exceeds effective rainfall. When this net amount reaches an appropriate threshold for irrigation, for example ½", then the observer can apply such amount by watering.

A screen located atop the evaporimeter protects the water therein. The screen can be rotated relative to the evaporimeter body so that either a day or date scale can be appropriately aligned with a reference mark. This indicates when the device was last filled with water and permits calculation of the net evapotranspiration rate in inches/day or inches/week. Comparison of this rate with the maximum expected rate for a locality provides a simple ratio for adjusting the relative amount or duration of irrigation throughout a season. Such approach, when used in conjunction with automatic irrigation timers, is often referred to as "water budgeting."

If the evaporimeter is placed within a sprinkling pattern, the rate at which water accumulates in the device can also be used to calculate the application rate of the sprinkler, or sprinklers (inches/hour). This permits the operator to know in future how long to run the sprinklers in order to replace net evapotranspiration losses.

In a first embodiment of the invention, a second container is disposed below a first container to collect overflow from the first container, both containers being supported by a ground spike. If this overflow is rainfall, then the contents of the second container are added to the first container prior to measuring net evapotranspiration on the indicating scale of the first container. If the overflow results from excess irrigation, the operator will know in future to reduce the operating duration of the irrigation sprinkler(s) so as to better match the applied amount with measured water requirements.

In a second embodiment of the invention, a second container is disposed above a first container to store overflow by sealing the outlet of the first container. Water enters and evaporates from the first container via the second container. During filling, the water level in the first container can be quickly brought to the outlet height by momentarily lifting the second container to allow drainage through the outlet. The height of the outlet corresponds to zero on the net evapotranspiration scale. An advantage of this embodiment is that, in accordance with Equation (5), the excess rainfall component (RR) reduces the evaporated water height in the first container (WA) without the need to manually transfer water from the second to the first container. In this second embodiment, a second screen also encompasses the first container so as to intercept a portion of the incoming radiation. The second screen is separated from the outer wall of the first container by an air gap, and is supported in this position by the first container. The thickness of the second screen, its color, and its distance from the first container are all factors that influence transmission of heat to the first container, and the pan coefficient ($K_{pan}$).

In a third embodiment of the invention, a second container is positioned above a first container with its outer wall fused to that of the first container at the height of the first container outlet. The outlet of the first container in this embodiment is centrally positioned, and is sealed by contact with a central tube that serves to support a second screen, as well as the device as whole. During filling, the water level in the first container is quickly zeroed to the level of the outlet height by lifting the first container to break its seal against the central tube. In addition to possessing the advantages of the second embodiment, this third embodiment attains thermal equilibrium with its environment more rapidly due to the chimney-like function of the central tube, and the use of a second screen having an open, ventilated design.

DETAILED DESCRIPTION

Figure 1:
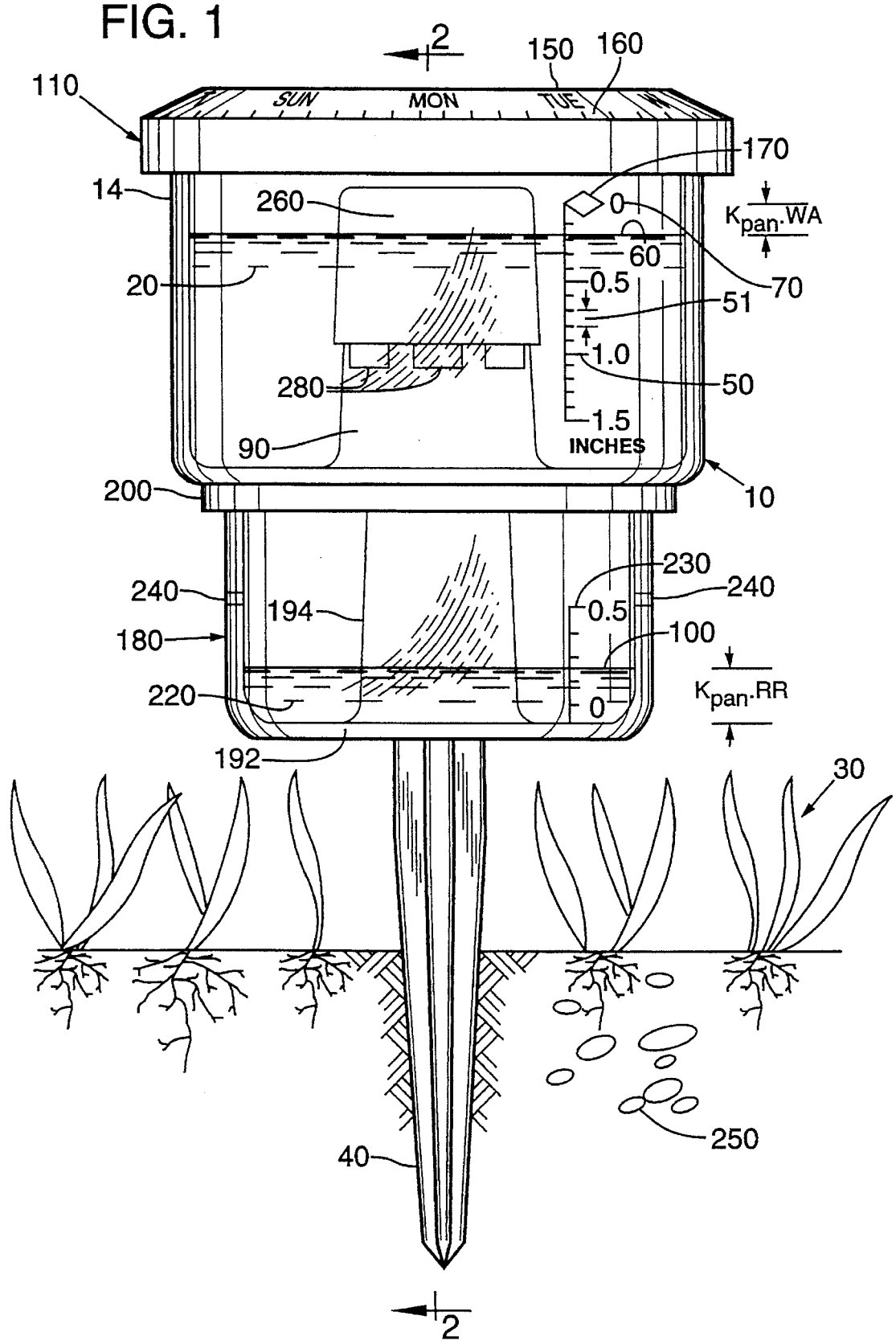
FIG. 1 is a side elevational view of a miniature pan evaporimeter having a second container positioned below a first container to collect overflow, and showing a net difference between evapotranspiration and effective rainfall of 0.05 inches since Tuesday morning if the contents of the second container were added to the first container.
Figure 2:
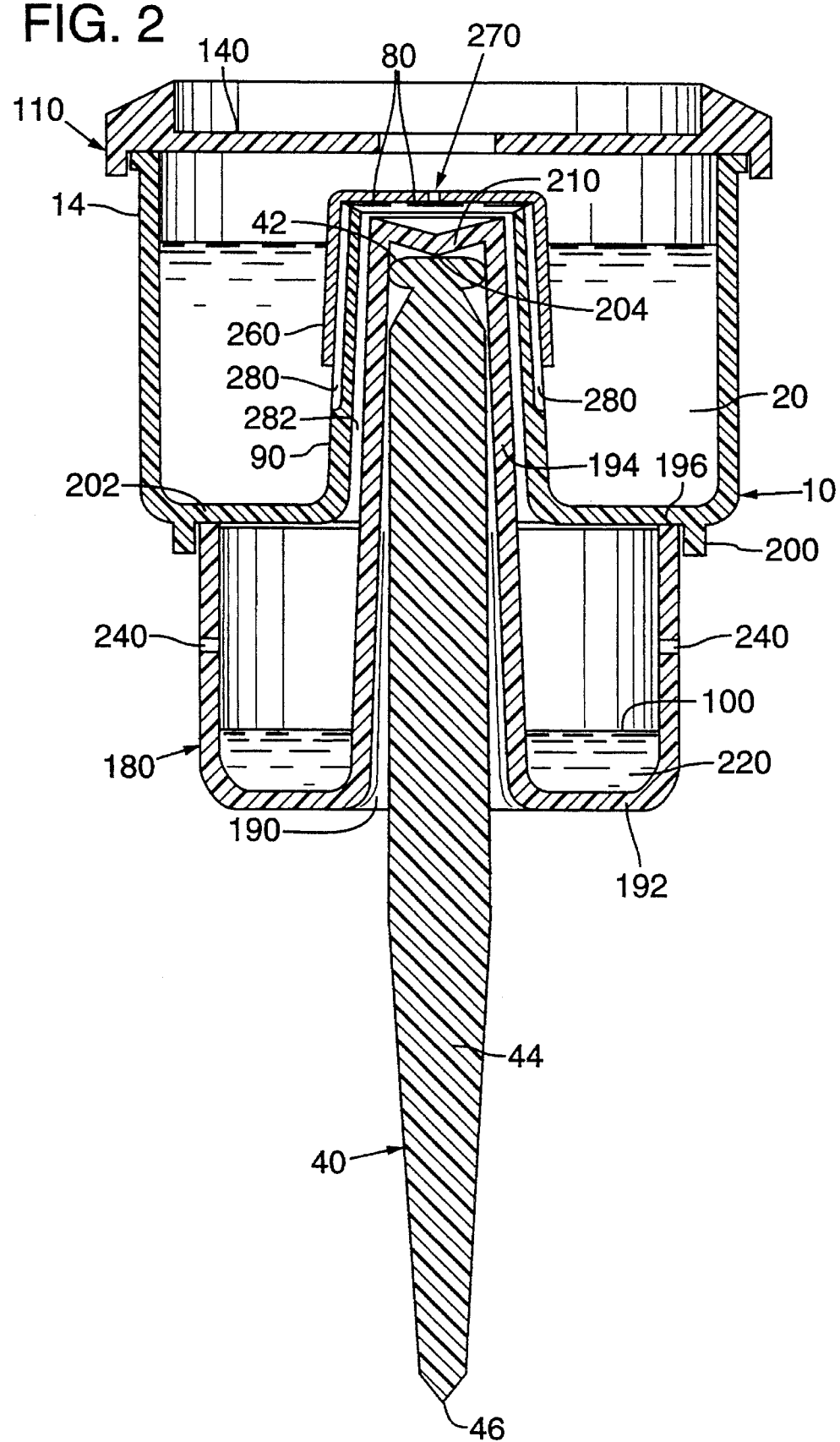
FIG. 2 is a vertical sectional view, taken along line 2—2 of FIG. 1, showing the self-levelling relationship between the evaporimeter and the ground spike.
Figure 3:
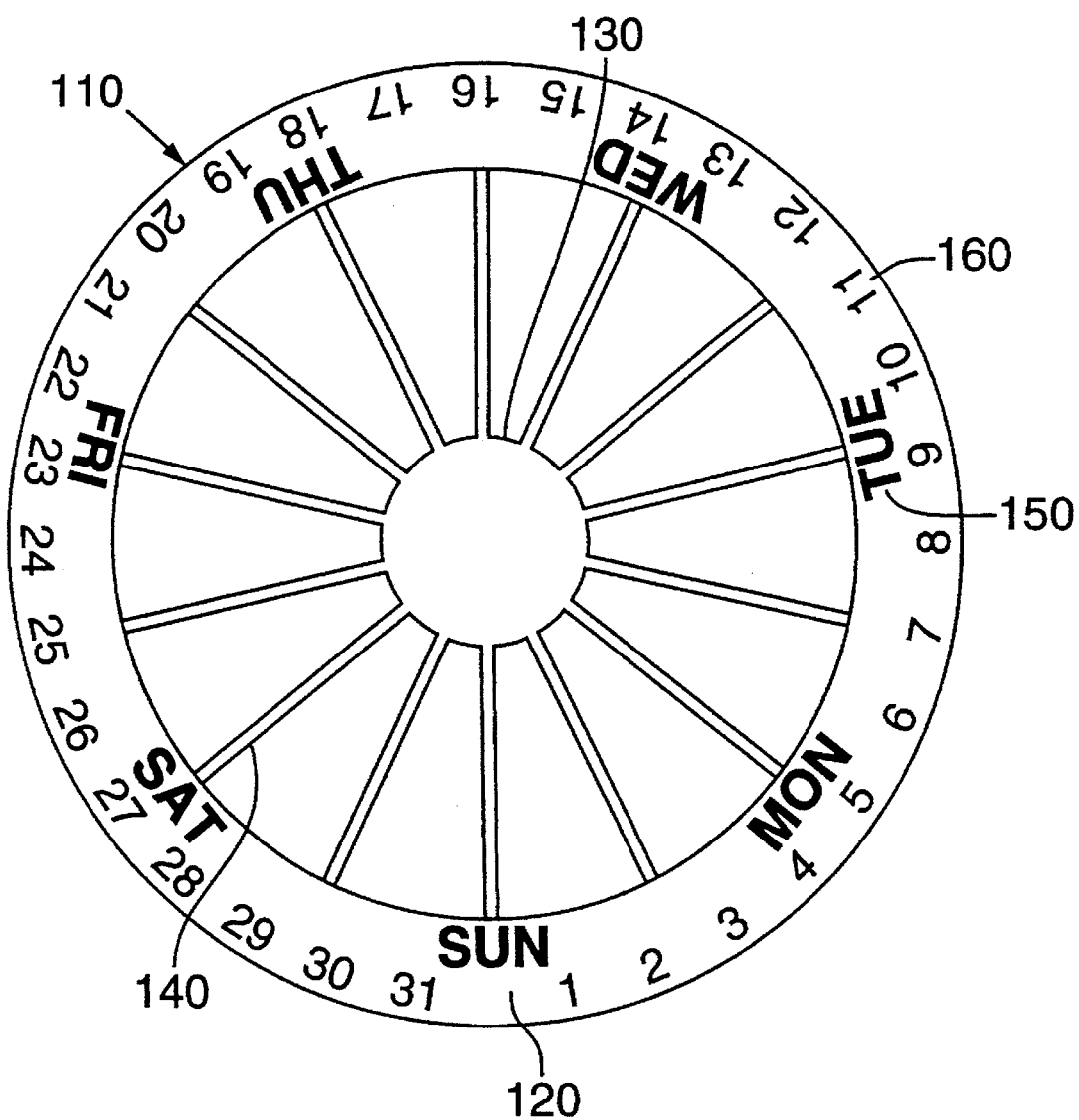
FIG. 3 is a top plan view of the evaporimeter of FIG. 1, showing elements of the screen and time scales.

A first embodiment of the pan evaporimeter according to the invention is shown in FIGS. 1–3. An open cylindrical first container 10 has an outer wall 14 made of radiation-transmissive material and is constructed for holding water 20. The container 10 is supported in close proximity to a vegetative surface 30, such as grass, by a ground spike 40 from which the container 10 is upwardly removable. The spike has an upper surface 42, a central shaft 44, and a pointed tip 46 to facilitate insertion in the ground.

An evaporation scale 50 indicates the level of water in the container 10, and is calibrated to provide a measure of the height of water that has evaporated from the surrounding vegetative surface, this height being equal to the term WA of Equation (5) multiplied by $K_{pan}$. As the water level in the device falls, the pan coefficient ($K_{pan}$) increases as a function of the distance of the water surface 60 from the top of a round rotatable screen 110 that is provided atop of the first container 10. The distance 51 between two consecutive indicia on scale 50 therefore decreases proportionately with increasing depth. This permits net ET from well-watered grass to be read directly from the scale 50. The actual distance between the zero mark 70 and any indicum on the scale 50 is equal to the indicated distance divided by the actual value of $K_{pan}$ when the water surface 60 is at the level of the indicum. If it were desired that the scale indicate the water requirements of plants other than well-watered grass, then the indicated distance would be further divided by $K_c$ of Equation (6) to determine the actual distance of an indicum from the zero mark. The zero mark 70 on the scale in either case is at the same elevation as a centrally located outlet 80. The mark 70 thus aligns horizontally with the level of the surface 60 of water in the first container 10 immediately after excess water has drained from the container 10 via the outlet 80 and an overflow tube 90 as shown in FIG. 2.

The screen 110, which is sufficiently porous to permit evaporation from the surface of water in the first container, has several uses. It protects the water within the evaporimeter from falling debris, such as leaves, and from small animals. The design and dimensions of the screen 110 are also factors in the regulation of evaporation from the evaporimeter since the screen intercepts solar radiation that would otherwise be absorbed by the water in container 10 via the surface 60 and the outer wall 14. The effect of the screen and its shading is to increase the value of $K_{pan}$ for the evaporimeter. Other means for shading the walls of container 10 would also have the effect of increasing $K_{pan}$. Absorption and transmission of radiation by the wall 14 can also be adjusted by the choice of materials from which it is made, its thickness, and by adding colorants. These factors can be adjusted, as needed, to achieve a desired value for $K_{pan}$. As shown in FIG. 3, the preferred screen includes an outer ring 120 and an inner ring 130 connected by fourteen equally spaced radiating struts 140 which define fourteen screen openings.

The screen 110 has time scales 150, 160 marked on the upper surface of the outer ring 120. The screen can be rotated so that an indicating mark 170 (see FIG. 1) on the side of the first container 10 points to either an indicium of scale 150 that indicates the day of the week or an indicium of scale 160 that indicates the day of the month. The user selects the setting to indicate when the first container 10 was last filled with water to the zero mark 70. As an alternative, the date scale could be located on the container 10 with the corresponding indicator mark being located on the rotatable screen 110.

A second cylindrical container 180, also constructed of a material that is at least partially transparent, is positioned below the first container 10 and is supported by the ground spike 40 that projects into a tapered recess 190 that is centrally located in the base wall 192 of the second container 180 and is defined by a wall 194. The bottom of the first container 10 comprises a base wall 202 that rests on and is supported by a horizontal, annular edge surface 196 of the second container 180. A cylindrical wall 200 projecting downwardly from the base wall 202 serves to prohibit evaporation from the second container 180. The entire assembly of containers 10 and 180 and screen 110 is maintained level by the tip 204 of a conical wall 210 that seals the upper end of the tapered recess 190. The tip 204 rests on the top surface 42 of the spike. And, because the center of gravity of the assembly is below the tip, the assembly is urged by gravity toward a plumb orientation. Level orientation facilitates uniformity of radiation capture by the evaporimeter, and accurate gauge readings.

Excess water, such as rainfall, drains from the first container 10 through its centrally located outlet 80 and overflow tube 90 into the second container 180 where the height 100 of the water surface is indicated by a second scale 230. The scale 230 is graduated to indicate the height that the water would have reached in the first container 10 if it had been allowed to remain there. Thus, when water overflows into the second container 180 due to rainfall, the height of the overflow pool 220, as read from the scale 230, equals the RR (rainfall removed) term of Equation (5) multiplied by $K_{pan}$. Overflow into the second container 180 in excess of the second container 180 capacity is drained to the ground through overflow slots 240. The capacity of the second container 180 reflects the capacity of soil 250 beneath a well-watered grass surface to retain excess water within the effective rooting depth. Thus, water drains from the second container when the amount of water captured by the evaporimeter over time is in excess of the amount that would be typically retained within the effective rooting depth of healthy, nonstressed turf grass.

A copper cap or cover 260 is located over the overflow tube 90 of the first container 10 to prevent rainwater from falling directly into the second container 180, i.e. without having first commingled with any water in the first container 10. The cap 260 has a small hole 270 (see FIG. 2) to prevent siphoning of water 20 from the first container 10 into the second container 180. The cap 260, being of copper, also has toxic properties that serve to inhibit algal growth in the water of both containers 10 and 180. Axially extending channels 280 are provided in the overflow tube 90 beneath the copper cap 260. A generally cylindrical passageway 282 is defined between the overflow tube 90 and the wall 194. Any excess water that enters the first container 10 flows through the channels 280, between the outlet 80 and cap 260, through the passageway 282, and into the second container 180.

The first and second containers 10, 180 can be removed from the ground spike 40, by lifting upwardly, to take readings at eye level and to permit the excess water in pool 220 to be poured from the second container 180 back into the first container 10. By capturing excess rainwater in the second container 180, then later adding it back to the remaining un-evaporated water 20 in the first container 10, the difference between evapotranspiration from well-watered grass and that effectively supplied by rainfall since the day or date indicated on the time scale 150 or 160 can be read on the evaporation scale 50 of the first container 10, this amount being a gauge and reference for regulating the irrigation of grass and other plant species that share the same locality as the pan evaporimeter.

Figure 4:
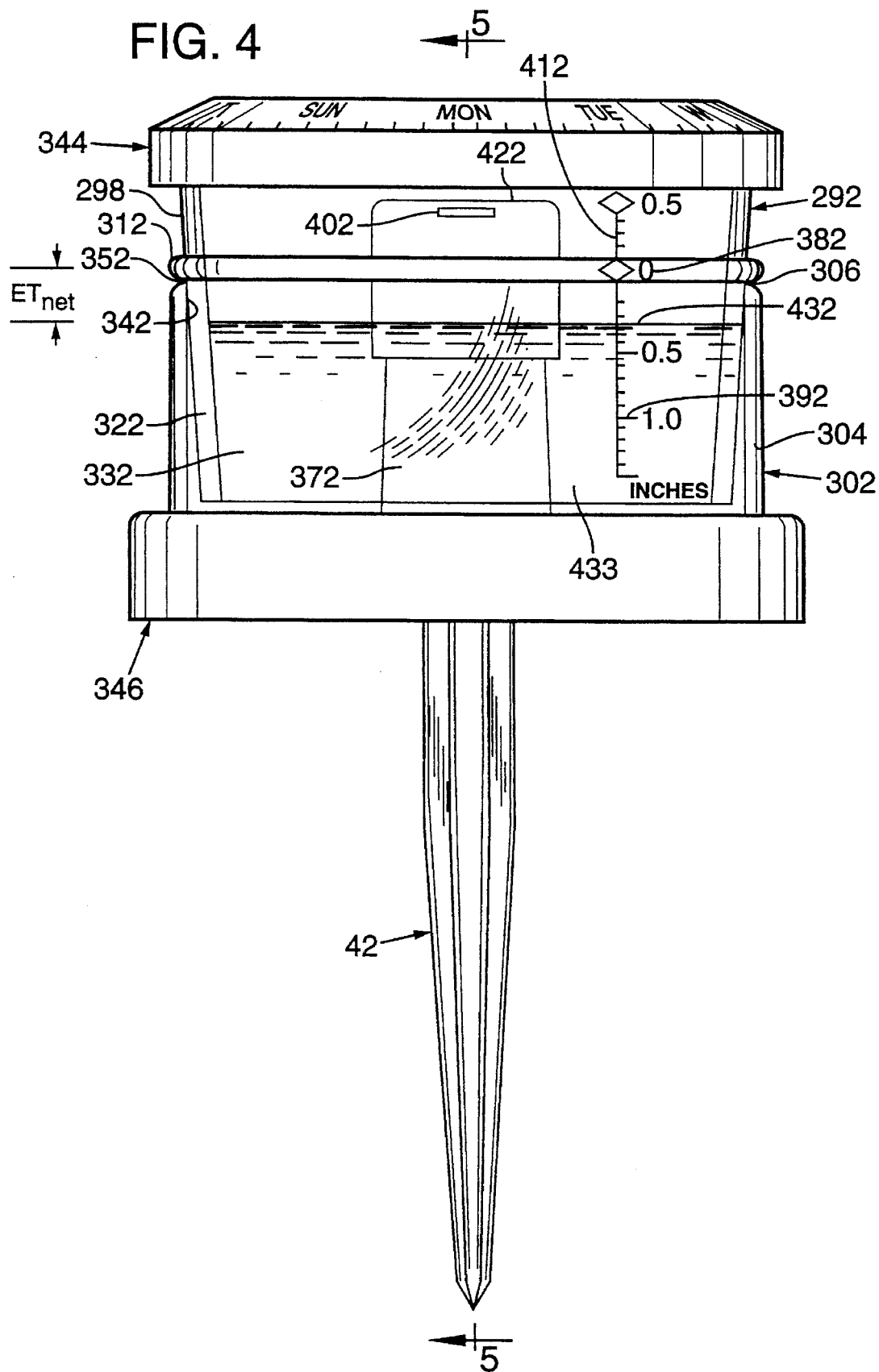
FIG. 4 is a side elevational view of a miniature pan evaporimeter having the second container positioned above the first container and a second screen for intercepting solar radiation, and showing a net difference between evapotranspiration and effective rainfall of 0.3 inches since Tuesday morning.
Figure 5:
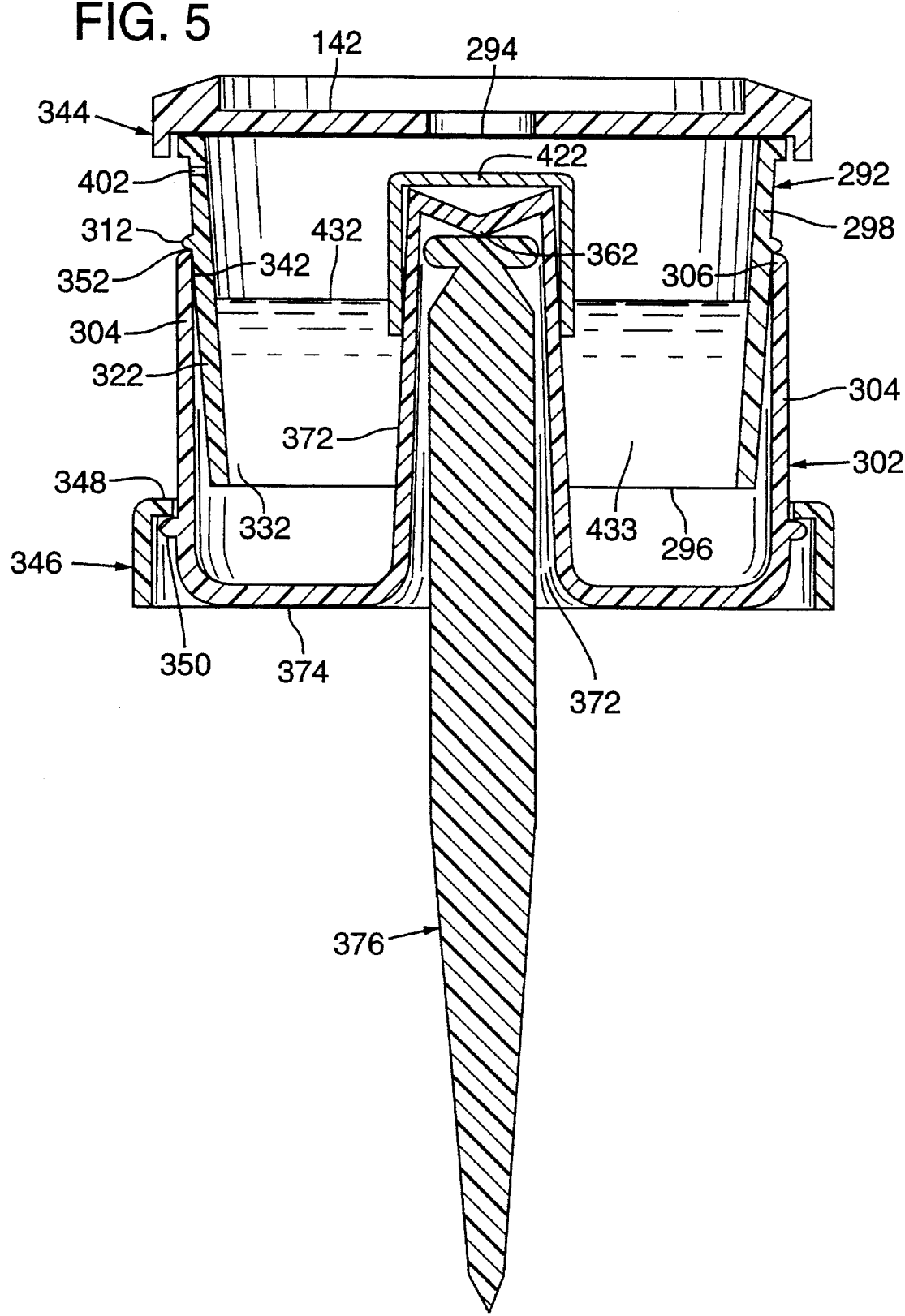
FIG. 5 is a vertical sectional view, taken along line 5—5 of FIG. 4, showing sealing of the first container outlet for overflow by a downward extension of the wall of the second container.

A second embodiment of the invention, shown in FIGS. 4 and 5, also employs first and second containers, but in a different configuration. A second container 292, constructed of a material that is at least partially transparent, is generally cylindrical, having top and bottom ends 294, 296, both of which are open. Most preferably, the container 292 is simply a frustoconical wall 298.

A first container 302 is positioned below the second container 292 and, like the second container, is constructed of a material that is at least partially transmissive of radiation. The first container 302 has a planar base wall 374. An outer wall 304 extends upwardly from the base wall 374 and terminates at a horizontal annular surface 306. The surface 306 defines an upwardly-opening mouth 352 that receives the second container 292. An outward extension of the wall 298 of the second container 292 forms a ring 312 that rests on the surface 306 to support the second container 292 above the first container 302. Below the ring 312, a downwardly extending portion 322 of the wall 298 forms a passageway 332 that communicates with the first container 302. The ring 312 and wall portion 322 form a seal against surfaces 306, 342 of the wall 304 to prevent water flowing from the first and second containers, while the second container 292 is nested in the first container 302. The second container 292 can be lifted out of the first container 302, at which point excess water will flow over the surface 306 such that the mouth 352 serves as an outlet for the first container 302.

When the containers are nested, rainfall enters, and water evaporates from, the first container 302 via the second container 292 and communicating passageway 332. When excess water enters the first container 302 it overflows into the second container 292. A rotating first screen 344, like the screen shown in FIG. 3, sits atop of the second container 292. A second screen 346 constructed of opaque material is positioned outside the first container 302 to intercept a portion of incoming solar radiation and thereby further modifies the value of $K_{pan}$ for the evaporimeter. The second screen 346 is cylindrical in shape, and is supported by an internally projecting lip 348 that rests upon a ring 350 formed by an outward extension of wall 304 of the first container 302.

In this embodiment, a tapered and recessed tube 372 is centrally located in the base wall 374 of the first container 302. The top of the tube is closed by a conical wall which descends to a point 362. The point 362 rests on the top of the ground spike 376, which in this embodiment projects upwardly into tube 372. The assembly of screen 344 and containers 292 and 302 is maintained plumb, with the surface 306 horizontal, by balance on the point 362. A copper cap 422 over the recessed tube 372 inhibits growth of algae and assists observation of the water level 432 from afar.

To use the assembled device of the second embodiment, the first container 302 is filled with water to the level of the surface 306 (first container outlet) by adding excess water to the evaporimeter, then momentarily lifting to unseat the second container 292 until the water level falls to that of the first container outlet 352. This level corresponds to the zero mark 382 of an evaporation scale 392 which, in the illustrated embodiment, is printed on the wall 304 of the first container 302. The combined, nested containers 292, 302 thus serve as a valve that controls flow through the first container outlet 352. This valve can be opened by raising the second container 292 such that it ceases to be in sealing contact with the first container 302.

As water evaporates with time, the surface 432 of the water pool 433 inside the evaporator will drop. Should rainfall occur, it will first replenish water that has evaporated from the first container 302. Excess rainfall that raises the water level above the zero mark 382 on the evaporation scale 392 will be stored in the second container 292. Rainfall that exceeds the capacity of the second container 292 is drained to the ground through overflow slots 402 provided in an upper region of the wall 298. The height of excess rainfall, if any, in the second container 292 is indicated by an excess water scale 412 printed on the wall 298. The reading, if any, on scale 412 corresponds to the term RR of Equation (5) multiplied by $K_{pan}$. Over time, and in accordance with Equation (5), this excess rainfall will reduce the amount of water (WA) that would need to be added to refill the first container 302.

Figure 6:
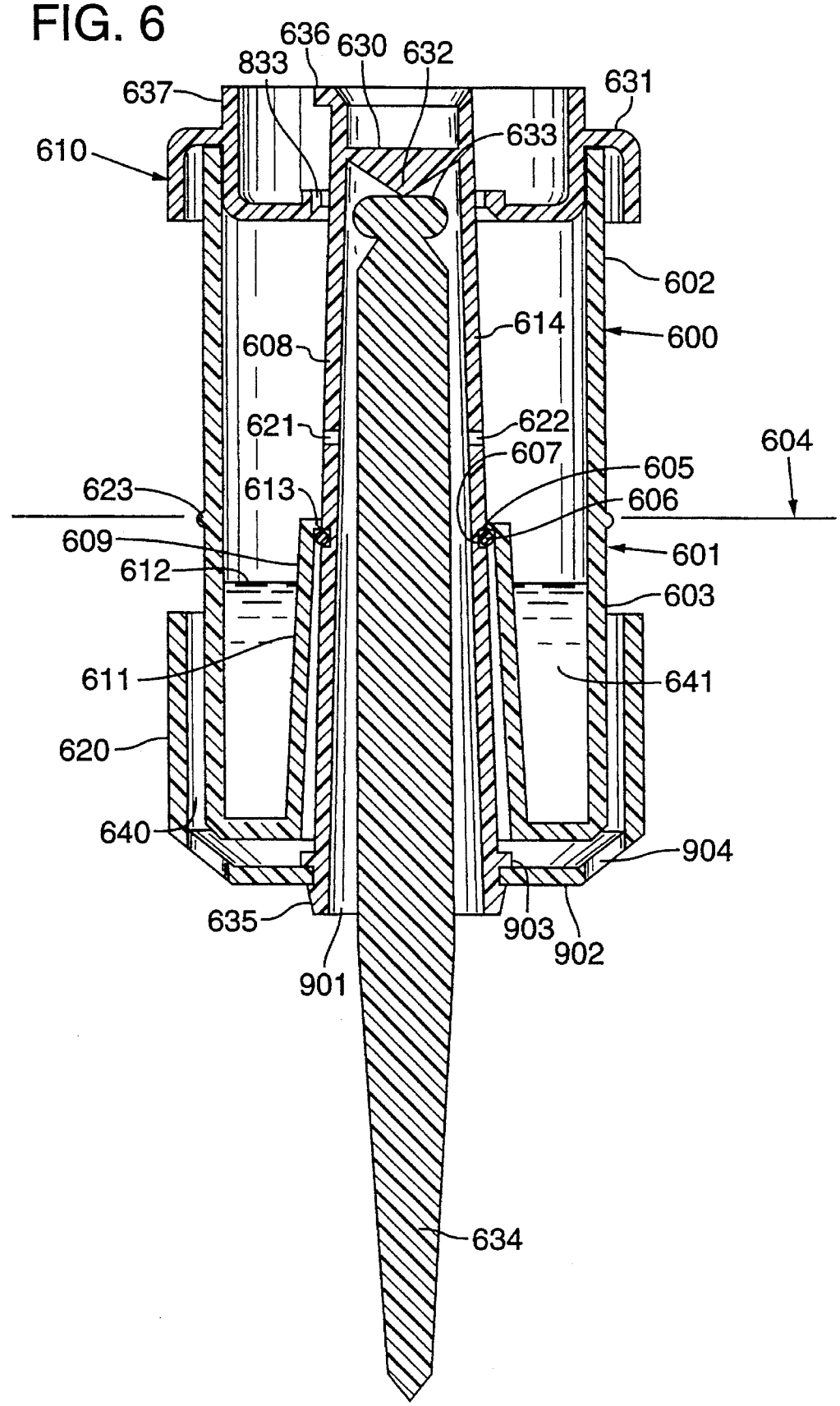
FIG. 6 is a vertical sectional view of a miniature pan evaporimeter having a second container positioned above a first container.

A third embodiment of the invention, shown in FIGS. 6–9, employs first and second containers having outer walls that are permanently connected, the outer wall 602 of the second container 600 being an upward extension of the outer wall 603 of the first container 601. The second container 600, shown in FIG. 6, is constructed of the same material as and is positioned above the first container 601. The outer wall 602 of the second container is permanently joined to the outer wall 603 of the first container at the height 604 of a first container outlet 605 so that water cannot pass between the outer walls 602, 603. The first container 601 has an inner wall 611 that serves as an overflow tube 609. The second container 600 has an inner wall 614 that is tubular, being an upper portion of a tapered tube 608. The uppermost edges of the walls 602, 614 define an annular opening for exposing the upper surface of water in the containers to the atmosphere. The outlet 605 of the first container 601 is centrally positioned, and is normally sealed by contact against an O-ring 606 retained within an external groove 607 of the tapered tube 608 which passes centrally through the first container overflow tube 609, the second container 600, a first screen 610, and a second screen 620.

To commence using the device, excess water is added to the evaporimeter such that the containers are filled to a level above the level 604. Then, an assembly consisting of the first container 601, outer wall 602 of the second container, and first screen 610, is lifted momentarily. While the assembly is lifted, water flows over the wall 611 (between the inner walls 611, 614) until the water level falls to that of the first container outlet 605 which, as in the first and second embodiments, corresponds to the zero mark 700 on an evaporation scale 701 shown in FIG. 7. Excess water in this case drains from the first container outlet 605 via the interior of first container overflow tube 609.

Figure 7:
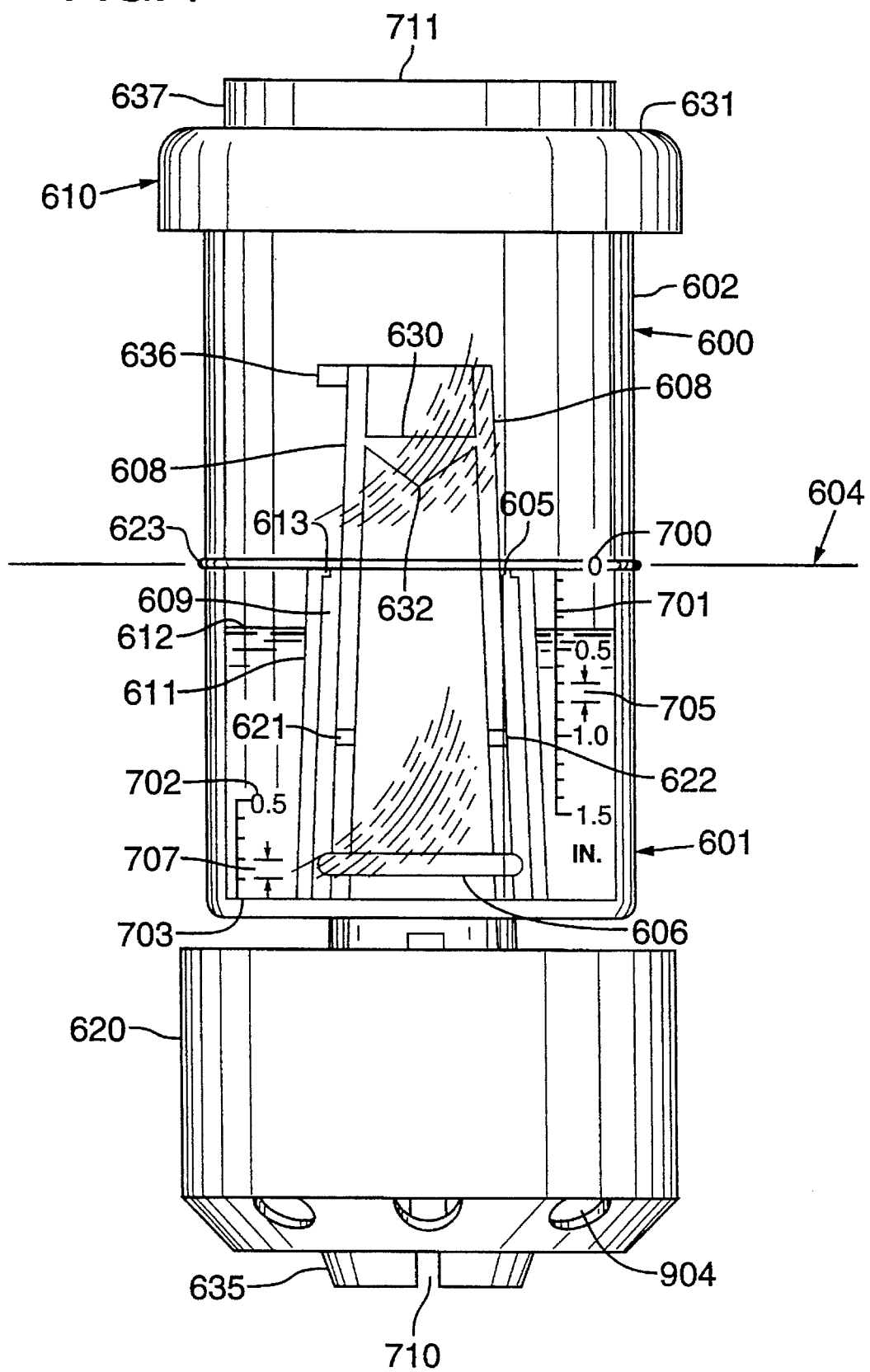
FIG. 7 is a side elevational view showing the containers, screens, and central ventilating tube of the evaporimeter of FIG. 6.

The wall 611 is outwardly tapered from its top to its bottom. The tapering of wall 611 serves to decrease the area of the water surface 612 as evaporation progresses. An evapotranspiration scale 701, shown in FIG. 7, is provided with indicia for gauging evapotranspiration, the position of each indicum being calculated so as to indicate the net amount of water that would have evaporated from healthy, nonstressed grass since the time the first container 601 was last filled with water to the level of the first container outlet 605. The actual distance (inches or millimeters) of each indicum from the zero mark 700 is the indicated distance (inches or millimeters) divided by the pan coefficient ($K_{pan}$). As the water level in the device falls, the pan coefficient increases as a function of the distance of the water surface from the top 711 of first screen 610 that is provided atop of the second container 600. The distance 705 between two consecutive indicia on the scale 701 therefore decreases with increasing depth. This permits net evapotranspiration to be read directly from the scale 701, this net amount being a gauge and reference for the irrigation of grass and other plant species that share the same locality as the evaporimeter. Because the tube 608 is tapered, the cross-sectional area of the outlet opening 605 increases progressively as the first container 601 is lifted upwardly (FIG. 7) from its seal against O-ring 606 (FIG. 6). An inwardly extending, annular constriction or flange 613 at the top of the overflow tube 609 rests upon the O-ring 606 when a first assembly (comprising first container 601, outer wall 602 of the second container, and first screen 610) is nested into a second assembly (comprising the tube 608 and the second screen 620) as shown in FIG. 6.

When the outlet of the first container 601 is sealed by O-ring 606, excess water such as rainfall is stored in the second container 600 up to the level of a second container outlet comprising two holes 621 and 622 in the central tube 608. A raised line 623 around the circumference of the evaporimeter at the joining elevation 604 of the first and second containers serves to conveniently indicate the zero net ET level around the entire device. A second scale 702 (FIG. 7), of which the zero mark 703 is positioned at the bottom of the first container 601, is provided in this embodiment so as to permit measurement of the amount and rate of water application by sprinklers if the empty evaporimeter is placed within a sprinkling pattern for this purpose. The distance 707 between two indica on this second scale is proportional to the ratio of catchment surface area of screen 610 to the area of the water surface 612 when its level is midway between the two indica.

Figure 8:
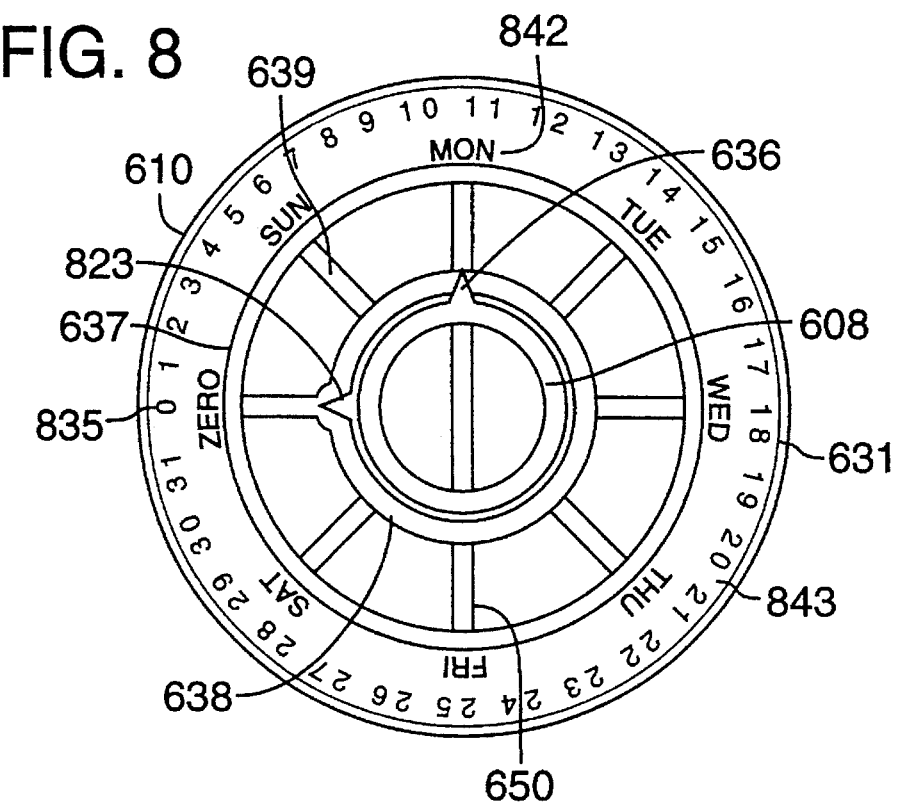
FIG. 8 is a top plan view of the evaporimeter of FIG. 6 showing elements of a first screen, time scales, and the position of an indicating mark attached to the outer perimeter of the central ventilating tube.

The entire first assembly (first container 601, outer wall 602 of the second container, and first screen 610) can be turned relative to an indicator mark 636. In the illustrated embodiment, the mark 636 extends from the upper perimeter of the central tube 608 which is visible when a user looks at the top of the evaporimeter. As shown in FIG. 8, the indicator tip 636 points to the day or date that the evaporimeter was filled. A day scale 842 and date scale 843 are marked on the upper surface 631 of the first screen 610 which, in this embodiment (FIG. 8), includes an outer ring 637 and an inner ring 638 that are connected by eight equally spaced radiating struts 639 that define eight screen openings 650. The screen 610 is press-fitted into the upper opening of the second container 600 where it is held in position by friction. The inner ring 638 of screen 610 has a recess 823 through which the indicator mark 636 on the central tube 608 can vertically pass when it is aligned with the zero mark 835 on the scales. Otherwise, when the upper and lower assemblies are nested together, as shown in FIG. 6, and when the indicator 636 points to any position on the scales other than zero, then the indicator also serves to prevent the complete separation of upper and lower assemblies, unless intended.

Figure 9:
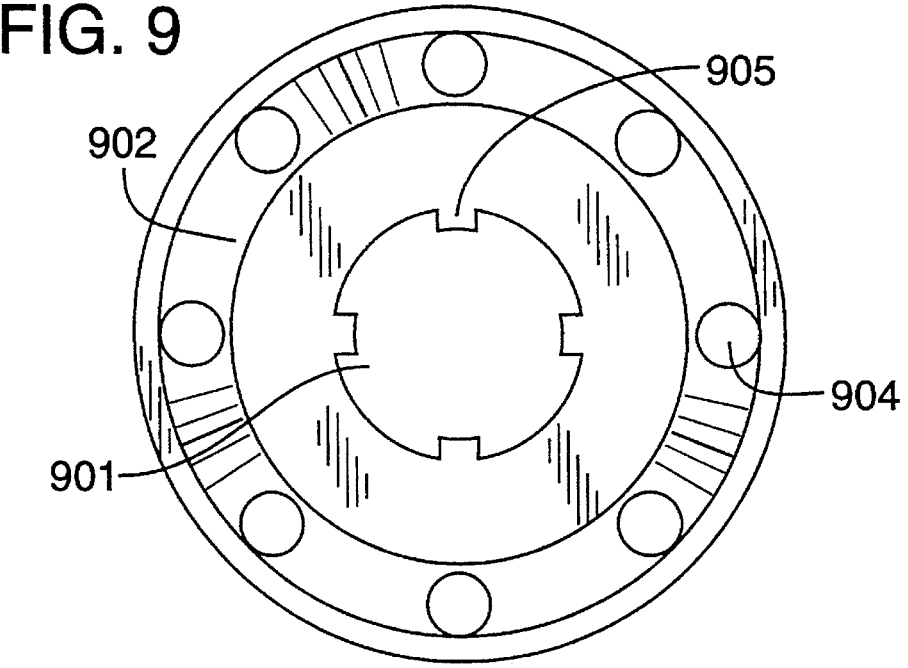
FIG. 9 is a top plan view of a second screen of the evaporimeter of FIG. 6, the screen having ventilating holes and a central hole that is indexed to receive the central tube.

Within the central tube 608, a lower surface of a diagonal strut 630 is formed into a conical tip 632 that balances upon a top surface 633 of a ground spike 634 so as to maintain the entire assembly of containers and screens, including a second screen 620, in a level condition. The screen 620 has a base 902 which defines a centrally positioned hole 901. The screen 620 is supported by outward projections 635 from the base of the tube 608, which tube passes through the hole 901 (FIGS. 6 and 9). Additional projections 903 prevent the screen from moving vertically. A portion of tube 608 below the groove 607 contains four vertical slots 710 (FIG. 7) that accept inward projections 905 (FIG. 9) from the sides of the central hole 901 in the base 902 of the second screen 620. The second screen 620 and tube 608 thus engage to form the second assembly in such a manner that the second screen 620 is prevented from rotating relative to the control tube 608.

With this arrangement, one can adjust the position of the indicator 636 by holding the second screen 620 and simultaneously turning the first assembly (container 601, wall 602, and first screen 610). A day scale 842 and date scale 843 on the first screen 610 move relative to the indicator 636. Thus, when the first and second assemblies are nested to form one unit, the position of the indicator 636 with respect to the indicia on the day and date scales is maintained by friction between the O-ring 606 and the inner surface of the first container outlet tube 609.

The tube 608 defines a vertically extending central bore having top and bottom ends that are both open to the atmosphere and thus facilitate heat exchange between the atmosphere and water within the evaporimeter, the width of the air gap between the tube 608 and spike 634 being a factor that influences the extent of heat exchange between the atmosphere and water in the containers 600, 601. The thickness of the second screen 620, its color, and the width of an air gap 640 between the wall 603 and the screen 620 are all factors that influence the extent of heat exchange between the second screen 620 and first container 601, and therefore the value of $K_{pan}$ for the evaporimeter. The width of the air space 640 is preserved by the overall arrangement, and the space is ventilated by eight holes 904 in the base 902 of the second screen, by the central hole 901, and by the vertical slots 710 in the central tube 608. Air movement upwards through the central tube 608 and around the first container wall 603 serves to rapidly bring the water content 641 of the first container 601 into thermal equilibrium with its environment, thereby diminishing the response time of the device to change, and generally improving its accuracy as an irrigation scheduling device.

Having illustrated and described the principles of my invention, it should be apparent to those persons skilled in the art that such invention may be modified in arrangement and detail without departing from such principles. I thus claim as my invention all such modifications as come within the true spirit and scope of the following claims.

I claim:

1. An evaporimeter for gauging the difference between an amount of water removed by evapotranspiration from healthy, nonstressed plants and an amount of water effectively replenished by rainfall, comprising:

a first container for holding water, the first container having a first container outlet for water overflow;

a second container for holding water, the second container having a second container outlet for water overflow and being positioned with respect to the first container such that water from the first container flows from the first container and into the second container when the water level in the first container exceeds the height of the first container outlet, at least one of the containers having an upwardly facing opening for exposing water in the evaporimeter to the atmosphere so that the water can evaporate, the first and second containers having parts that engage one another in such a manner that water can not flow through the first container outlet when the parts are engaged and the evaporimeter is in use gathering data so that any excess water entering the first container overflows from the first container into the second container, the parts being separable so that the excess water can be drained from the second container by separating the parts to open the first container outlet; and a scale for gauging the height of water in the containers, the scale having a zero mark at the same height as the first container outlet and having a series of indicia below the zero mark, the indicia being..positioned to indicate the net amount of water that would have been removed by evapotranspiration from healthy, nonstressed plants in the locality of the evaporimeter and that was not effectively replenished by rainfall since a known time when the first container was filled with water to the level of the first container outlet, this net amount being a gauge and reference for regulating the irrigation of grass and other plant species that share the same locality as the evaporimeter.

2. The evaporimeter of claim 1 further comprising a screen extending over the opening of the second container, the screen being sufficiently porous to permit evaporation from the surface of water in the containers.

3. The evaporimeter of claim 2 further comprising:

a date scale comprising multiple day or date indicia on the screen; and a mark on one of the containers for pointing to one of the indicia that indicates the day or date when a previous reading was taken, the screen being movable with respect to the mark.

4. The evaporimeter of claim 1 wherein at least one part of the evaporimeter has toxic properties that inhibit the growth of algae in water contained by at least one of the containers.

5. The evaporimeter of claim 1 further comprising a ground spike positioned to support both the first and second containers.

6. The evaporimeter of claim 5 wherein both containers are removable from the ground spike.

7. The evaporimeter of claim 5 wherein the first container has a downwardly projecting point that rests on top of the ground spike so that gravity urges the containers to tilt toward plumb orientations.

8. The evaporimeter of claim 1 wherein the first container is made of a material that permits partial transmission of radiation for absorption by water within the first container and that is sufficiently transparent to permit viewing of the water level within the first container.

9. The evaporimeter of claim 1 wherein:

the scale is located on the side of the second container; and the scale has a zero mark corresponding to the water level within the first container immediately after excess water has drained from the first container via the first container outlet.

10. The evaporimeter of claim 1 wherein the second container outlet is located so that water drains from the second container when the amount of water captured by the evaporimeter over time is in excess of the amount that would be retained within the effective rooting depth of healthy, nonstressed turf grass.

11. The evaporimeter of claim 1 wherein:

the evaporimeter further comprises a ground spike positioned to support both the first and second containers; and the first container has a planar base and a downwardly projecting point that rests on top of the ground spike such that the containers balance on the point and gravity urges the containers to tilt toward an orientation wherein the base is horizontal.

12. The evaporimeter of claim 1 wherein:

the first container has an outer wall; and the second container has an outer wall, and wherein the parts that engage are the outer walls of the first and second containers.

13. The evaporimeter of claim 1 wherein at least one of the containers defines a cavity having a horizontal cross-sectional area that decreases progressively from an upper to a lower elevation.

14. The evaporimeter of claim 1:

wherein the containers have outer walls; and further comprising a screen that extends outwardly from at least one of the outer walls to intercept incoming radiation which would otherwise strike at least one of the walls.

15. An evaporimeter for gauging the difference between an amount of water removed by evapotranspiration from healthy, nonstressed plants and an amount of water effectively replenished by rainfall, comprising:

a first container for holding water, the first container having an inner wall, an outer wall, and a first container outlet for water overflow;

a second container for holding water, the second container having an inner wall (a) that is sealed to the inner wall of the first container when the evaporimeter is in use gathering data such that excess water entering the first container overflows into the second container, and (b) that can be separated from the inner wall of the first container such that excess water in the second container can pass between the inner walls, an outer wall that is joined to the outer wall of the first container such that water cannot pass between the outer walls, a second container outlet for water overflow, and an upwardly facing opening for exposing water in the evaporimeter to the atmosphere, the second container being positioned above the first container such that water from the first container flows from the first container and into the second container when the water level in the first container exceeds the height of the first container outlet and so that water enters and evaporates from the first container via the second container; and at least one indicator scale on at least one of the containers, for indicating the height of water in the containers so that when the water content of the second container is added to the water content of the first container, the net amount of water that would have been removed by evapotranspiration from healthy, nonstressed plants in the locality of the evaporimeter and that was not effectively replenished by rainfall since a known time when the first container was filled with water to the level of the first container outlet, is indicated by the scale, this amount being a gauge and reference for regulating the irrigation of grass and other plant species that share the same locality as the evaporimeter.

16. An evaporimeter for gauging the difference between an amount of water removed by evapotranspiration from healthy, nonstressed plants and an amount of water effectively replenished by rainfall, comprising:

a first container for holding water, the first container having a first container outlet for water overflow;

a second container for holding water, the second container being open at its top for exposing water in the evaporimeter to the atmosphere, the second container having a second container outlet for water overflow and a vertically extending inner wall that is tubular and that is visible when a user looks at the top of the evaporimeter, the second container being positioned with respect to the first container such that water from the first container flows from the first container and into the second container when the water level in the first container exceeds the height of the first container outlet;

a screen extending over the second container, the screen being sufficiently porous to permit evaporation from the surface of water in the evaporimeter, the screen bearing a date scale comprising multiple day or date indicia, the inner wall bearing a device for pointing to one of the indicia to indicate the day or date when a previous reading was taken, and the screen being rotatable with respect to the inner wall so that the date scale and the device are movable with respect to each other; and at least one indicator scale on at least one of the containers for indicating the height of water in the containers so that when the water content of the second container is added to the water content of the first container, the net amount of water that would have been removed by evapotranspiration from healthy, nonstressed plants in the locality of the evaporimeter and that was not effectively replenished by rainfall since a known time when the first container was filled with water to the level of the first container outlet, is indicated by the scale, this amount being a gauge and reference for regulating the irrigation of grass and other plant species that share the same locality as the evaporimeter.

17. An evaporimeter for gauging the difference between an amount of water removed by evapotranspiration from healthy, nonstressed plants and an amount of water effectively replenished by rainfall, comprising:

a first container for holding water, the first container having a first container outlet for water overflow;

a second container for holding water, the second container having a second container outlet for water overflow and being positioned with respect to the first container such that water from the first container flows from the first container and into the second container when the water level in the first container exceeds the height of the first container outlet, the first and second containers having inner walls that define a vertically extending central bore having top and bottom ends that are both open to the atmosphere to facilitate heat exchange between the atmosphere and water within the evaporimeter, at least one of the containers having an upwardly facing opening for exposing water in the evaporimeter to the atmosphere; and at least one indicator scale on at least one of the containers for indicating the height of water in the containers so that when the water content of the second container is added to the water content of the first container, the net amount of water that would have been removed by evapotranspiration from healthy, nonstressed plants in the locality of the evaporimeter and that was not effectively replenished by rainfall since a known time when the first container was filled with water to the level of the first container outlet, is indicated by the scale, this amount being a gauge and reference for regulating the irrigation of grass and other plant species that share the same locality as the evaporimeter.

18. An evaporimeter for gauging the difference between an amount of water removed by evapotranspiration from healthy, nonstressed plants and an amount of water effectively replenished by rainfall, comprising:

a first container for holding water, the first container having an outer wall and a first container outlet for water overflow;

a second container for holding water, the second container having an outer wall, having a second container outlet for water overflow, and being positioned with respect to the first container such that water from the first container flows from the first container and into the second container when the water level in the first container exceeds the height of the first container outlet;

a first screen that extends over at least one of the containers, the first screen being sufficiently porous to permit evaporation from an underlying body of water in the evaporimeter;

a second screen that extends outwardly from at least one of the outer walls to intercept incoming radiation which would otherwise strike at least one of the walls;

an indicator scale for gauging the height of water in the containers, the scale having a zero mark at the same height as the first container outlet and having a series of indicia below the zero mark, the indicia being positioned to indicate the net amount of water that would have been removed by evapotranspiration from healthy, nonstressed plants in the locality of the evaporimeter and that was not effectively replenished by rainfall since the time when the first container was last filled with water, this amount being a gauge and reference for regulating the irrigation of grass and other plant species that share the same locality as the evaporimeter; and a ground spike positioned to support both the first and second containers, with at least one of the containers being movable with respect to the spike.

19. An evaporimeter for gauging the difference between an amount of water removed by evapotranspiration from healthy, nonstressed plants and an amount of water effectively replenished by rainfall, comprising:

a first container for holding water, the first container having (a) a vertically extending inner wall that is tubular, (b) an outer wall, and (c) a base wall, the inner and outer walls defining an upwardly-facing opening which serves as a first container outlet for water overflow;

a second container for holding water, the second container having (a) a vertically extending inner wall that is tubular and that is visible when a user looks at the top of the evaporimeter, and (b) an outer wall that is an upward extension of the outer wall of the first container, the inner and outer walls of the second container defining an upwardly-facing opening through which water in the evaporimeter is exposed to the atmosphere, one of the walls of the second container defining a second container outlet for water overflow, the second container being positioned above the first container with the inner walls sealed together when the evaporimeter is in use gathering data such that water from the first container flows upwardly from the first container and into the second container when the water level in the first container exceeds the height of the first container outlet;

a first screen that extends over the opening of the second container, the first screen being sufficiently porous to permit evaporation from water in the evaporimeter;

a second screen that extends outwardly from at least one of the outer walls to intercept incoming radiation which would otherwise strike at least one of the outer walls;

at least one indicator scale on at least one of the containers for indicating the height of water in the containers so that sum of the water contents of the first and second containers can be determined to indicate the net amount of water that would have been removed by evapotranspiration from healthy, nonstressed plants in the locality of the evaporimeter, and that was not effectively replenished by rainfall since the time when the first container was last filled with water, this amount being a gauge and reference for regulating the irrigation of grass and other plant species that share the same locality as the evaporimeter;

a date scale comprising multiple day or date indica on the first screen;

a pointer on the inner wall of the second container for pointing to one of the indica that indicates the day or date when a previous reading was taken, the date scale and the pointer being movable with respect to each other; and a ground spike positioned to support both the first and second containers.

20. A method for regulating the irrigation of grass and other plant species, the method comprising:

providing an evaporimeter having a first container for holding water, the first container having a first container outlet for water overflow, a second container for holding water, the second container having a second container outlet for water overflow, at least one of the containers having an upwardly facing opening for exposing water in the evaporimeter to the atmosphere so that the water can evaporate, the first and second containers having parts that engage one another in such a manner that water can not flow through the first container outlet when the evaporimeter is in use gathering data so that any excess water entering the first container overflows from the first container into the second container when the water level in the first container exceeds the height of the first container outlet, the parts being separable so that the excess water can be drained from the second container by separating the parts to open the first container outlet, and a scale for gauging the height of water in the containers, the scale having a zero mark at the same height as the first container outlet and having a series of indicia below the zero mark, the indicia being positioned to indicate the net amount of water that would have been removed by evapotranspiration from healthy, nonstressed plants in the locality of the evaporimeter and that was not effectively replenished by rainfall since a known time when the first container was filled with water to the level of the zero mark;

filling the first container with water to the level of the zero mark, including separating the parts of the first and second containers so that any water in excess of the amount needed to fill the first container is drained through the first container outlet;

noting the time when the filling occurs; and after a period of time, comparing the level of water in the first container to the indicia to determine the net amount of water that would have been removed by evapotranspiration from healthy, nonstressed plants in the locality of the evaporimeter and that was not effectively replenished by rainfall since the time when the filling occurred, this net amount being a gauge and reference for regulating the irrigation of grass and other plant species that share the same locality as the evaporimeter.

\* \* \* \* \*